US 9,491,397 B2

(12) United States Patent
Basra et al.

(10) Patent No.: US 9,491,397 B2
(45) Date of Patent: Nov. 8, 2016

(54) TRICK PLAY ADVERTISING

(75) Inventors: Arvind Basra, Glen Ridge, NJ (US); Woo Beum Lee, Basking Ridge, NJ (US)

(73) Assignee: Verizon New Jersey Inc., Newark, NJ (US)

( * ) Notice: Subject to any disclaimer, the term of this patent is extended or adjusted under 35 U.S.C. 154(b) by 1152 days.

(21) Appl. No.: 13/052,804

(22) Filed: Mar. 21, 2011

(65) Prior Publication Data

US 2012/0243850 A1    Sep. 27, 2012

(51) Int. Cl.
| H04N 5/76 | (2006.01) |
| H04N 5/765 | (2006.01) |
| H04N 21/44 | (2011.01) |
| H04N 21/442 | (2011.01) |
| H04N 21/45 | (2011.01) |
| H04N 21/472 | (2011.01) |
| H04N 21/81 | (2011.01) |
| G06Q 30/02 | (2012.01) |
| H04N 5/783 | (2006.01) |

(52) U.S. Cl.
CPC .......... *H04N 5/765* (2013.01); *G06Q 30/0241* (2013.01); *H04N 5/76* (2013.01); *H04N 21/44016* (2013.01); *H04N 21/44222* (2013.01); *H04N 21/4532* (2013.01); *H04N 21/47217* (2013.01); *H04N 21/812* (2013.01); *H04N 5/783* (2013.01)

(58) Field of Classification Search
None
See application file for complete search history.

(56) References Cited

U.S. PATENT DOCUMENTS

| 2008/0253406 A1* | 10/2008 | Hasek ........................... 370/535 |
| 2009/0210901 A1* | 8/2009 | Hawkins et al. ............... 725/34 |
| 2009/0317053 A1 | 12/2009 | Morley et al. | |
| 2010/0325660 A1* | 12/2010 | Holden ......................... 725/34 |
| 2011/0219400 A1* | 9/2011 | Candelore et al. ............. 725/34 |

OTHER PUBLICATIONS

"TiVo's Fast Forward Ads Are Back—My Surmise", http://surmise.blogspot.com/2007/01/tivos-fast-forward-ads-are-back_15.html, 3 pages, Jan. 15, 2007.

* cited by examiner

*Primary Examiner* — Eileen Adams (57) ABSTRACT

A device receives trick play signals during a playing of content. The device determines a trick play being request based on the trick play signals. The device further estimates a length of an available time period based on the trick play and information regarding at least one other trick play. The at least one other trick play occurred prior to the trick play. The device also retrieves an advertisement for the available time period based on a length of the available time period. The advertisement is one of a plurality of advertisements of different lengths. The device displays the advertisement, on a display, during the available time period.

20 Claims, 7 Drawing Sheets

TRICK PLAY ADVERTISING

BACKGROUND

Television content providers sell timeslots during programs to various advertisers. The advertisers show commercials to viewers during the timeslots to promote various goods, services, and ideas. However, viewers are increasingly utilizing a variety of technology (e.g., Video on Demand (VOD), digital video recorder (DVR), etc.) that allows them to enjoy the programs without viewing the commercials. The technology allows viewers to use trick plays to, for example, fast forward through commercials. Consequently, content providers and advertisers are losing opportunities to show commercials to users. Re-encoding commercials into VOD content and/or recorded DVR content and forcibly displaying the commercials requires utilizing lots of resources and negatively effects viewers' experience.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

An implementation described herein may provide trick play advertising. A client device (e.g., a set-top box (STB)) and/or a remote server may provide the trick play advertising when a user requests a trick play. A trick play may refer to any interactive action a user may perform while playing content. Trick plays may include, for example, pausing, fast forwarding, rewinding, slow-motion fast forwarding, slow-motion rewinding, etc. A user may perform a trick play at different levels. For example, the user may perform fast forwarding at levels 1-4. Level 1 may represent the slowest fast forwarding speed and level 4 may represent the fastest fast forwarding speed. An available time period may refer to an available period of time during which advertisements may be shown to a user while the trick play is being performed.

As used herein, client device may refer to any media processing device that may receive multimedia content over a network, and may provide such multimedia content to an attached display device, such as a television or a computer monitor. Multimedia content, as used herein, may refer to content provided by television, telephone, networking and/or other multimedia services via a distribution network, such as cable, optical fiber, satellite, or virtual private networks.

Also, as used herein, the terms user, viewer, subscriber, and customer may refer interchangeably to a person who interacts with, records, orders, uploads, listens to, and/or plays multimedia content via a multimedia service. Furthermore, key and button may be used interchangeably to refer to a tool used to transmit trick play signals to request a trick play.

Figure 1:
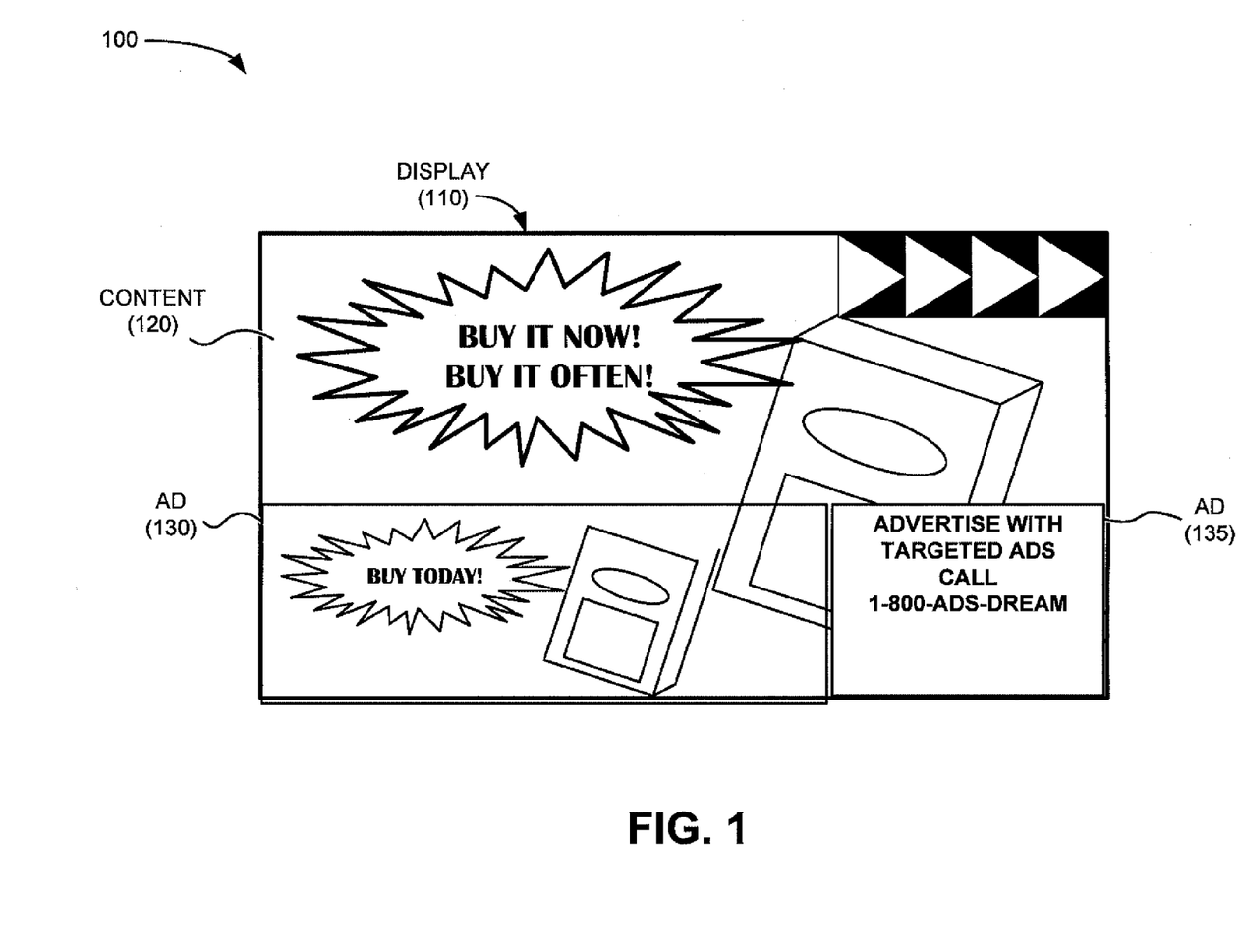
FIG. 1 is a diagram that illustrates an overview of an implementation described herein.

FIG. 1 is a diagram 100 that illustrates an overview of an implementation described herein. As shown in FIG. 1, a display 110 of a display device (e.g., a television (TV)) may include content 120. In this example, assume that a user, who is playing content 120, requests a trick play by pressing a fast forward key of a remote control four times when (or right after) commercials begin during the playing of content 120. In response, a client device, which is connected to the display device, may determine an available time period based on the trick play (i.e., the fast forwarding at level 4) and the user's previous behavior. The client device may transmit a request for trick play advertising for the available time period. In response, the client device may receive an ad 130 and an ad 135. Ad 130 may include, for example, a video advertisement. Ad 135 may include, for example, a still-image advertisement. Assume that the user presses a play key before an end of the determined available time period. In response, the client device may automatically cease showing ad 130 and ad 135 on display 110, and continue the playing of content 120 on display 110.

Figure 2:
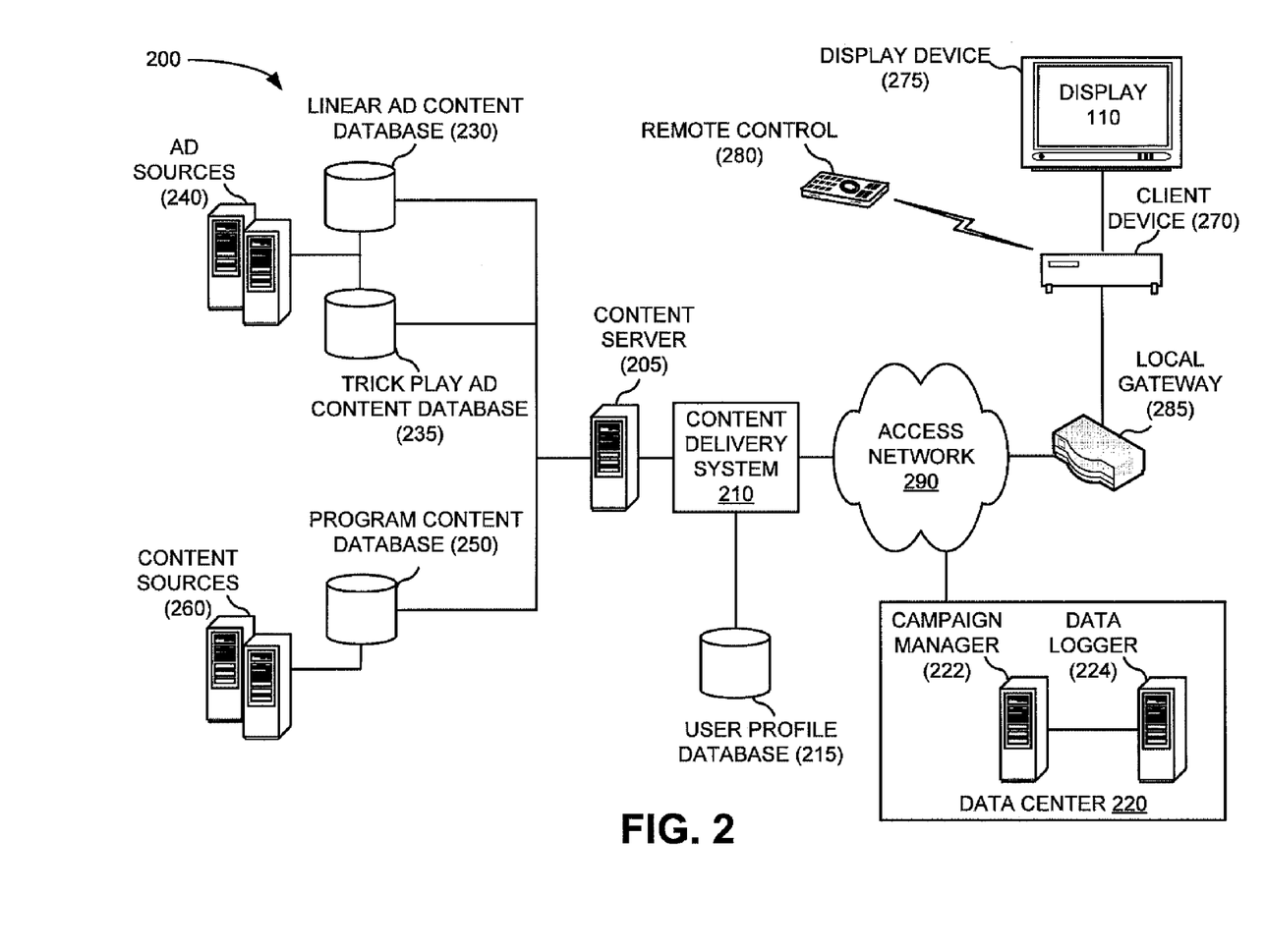
FIG. 2 is a diagram of an example environment in which systems and/or methods described herein may be implemented.

FIG. 2 is a diagram of an example environment 200 in which systems and/or methods described herein may be implemented. Environment 200 may include a content server 205, a content delivery system 210, a user profile data source 215, a data center 220, a linear advertising content database 230, a trick play advertising content database 235, advertising sources 240, a program content database 250, content sources 260, a client device 270, a display device 275, a remote control 280, a local gateway 285, and an access network 290. Data center 220 may include a campaign manager 222 and a data logger 224. Client device 270, display device 275, remote control 280, and local gateway 285 may be located at a customer's premises and may be connected via access network 290 to content delivery system 210 and/or content server 205 at, for example, a multimedia service provider's premises.

In practice, environment 200 may include additional components, fewer components, different components, or differently arranged components than are shown in FIG. 2. Also, two or more of the components, of FIG. 2, may be implemented within a single device, or a single device may be implemented as multiple, distributed devices. For example, one content server 205, one content delivery system 210, one user profile data source 215, one data center 220, one campaign manager 222, one data logger 224, one linear advertising content database 230, one trick play advertising content database 235, one set of advertising sources 240, one program content database 250, one set of content sources 260, one client device 270, one display device 275, one remote control 280, one local gateway 285, and one access network 290 have been illustrated in FIG. 2. In practice, there may be more networks, servers, databases, gateways, client devices, and/or display devices. Also, in some instances, one or more of the components of environment 200 may perform one or more functions described as being performed by another one or more of the components of environment 200.

Components of environment 200 may interconnect via wired and/or wireless connections. Further, while FIG. 2 shows direct connections between some of the components, any of these connections can be indirectly made via a network, such as a local area network, a wide area network (e.g., the Internet), a telephone network (e.g., the Public Switched Telephone Network (PSTN) or a cellular network), an ad hoc network, a fiber optic network (e.g., a fiber optic service (FiOS) network), or a combination of networks.

Content server 205 may include one or more devices for providing content/information to client device 270 and/or display device 275. Examples of content server 205 may include a headend device that provides television content or pay-per-view (PPV) events, a video-on-demand (VOD) device or another device that provides multimedia content upon request, an advertising server that provides advertising associated with multimedia content, and/or a program guide information server that provides information related to multimedia content available to client device 270.

Content server 205 may communicate with a variety of other components within environment 200, such as devices within content delivery system 210, linear advertising content database 230, trick play advertising content database 235, and/or program content database 250, to provide multimedia services to customers. While shown as a single server component in FIG. 2, in other implementations, content server 205 may be distributed among multiple servers. For example, content server 205 may be split as a separate advertising content server and a separate program content server.

Content delivery system 210 may include one or more components to deliver broadcast and/or other multimedia content to client device 270. In general, content delivery system 210 may provide control over (e.g., via access network 290) television services for devices, such as client devices 270, display devices 275, and/or other network connectivity devices (e.g., personal computers, not shown) provided at the customer's premises. Content delivery system 210 may include, for example, video hub offices (VHOs), databases, gateways, servers, network switches, and/or routers that may be connected by wired and/or wireless connections. Content delivery system 210 may serve as a link between a client device 270 and content server 205 to enable delivery of television content, on-demand multimedia content, advertising, applications, etc. For example, content delivery system 210 may facilitate communications between content server 205 and client device 270 via access network 290. In one implementation, content delivery system 210 may combine broadcast programming content with advertising content (retrieved, e.g., from content server 205) to provide a combined program content/advertising stream to client device 270. In some implementations, content delivery system 210 may also collect information from client devices 270 that may be used, for example, to generate user profiles.

User profile database 215 may include data for client device 270 or groups of client devices that may be used to provide targeted trick play advertising. For example, advertisements may be assigned a unique advertising identifier that may be cross-referenced to particular demographics, preferences, or other indicators that may be obtained from user profiles. Advertisers may classify particular advertising content based on demographic groups, common preferences, and/or other information that can be used in determining particular client devices 270 (or groups of client devices) to which to provide the trick play advertising. Content delivery system 210 may retrieve user profile information from user profile database 215 and retrieve trick play advertising from content server 205 based on the user profile information. Data center 220 may include one or more devices that are capable of collecting data and performing statistical analysis on user activity of client device 270 and other client devices. Data center 220 may combine related data into groups of accounts based on, for example, pattern analysis and correlation. In an implementation described herein, data center 220 may include campaign manger 222 and data logger 224.

Campaign manager 222 may include one or more server devices, or other types of computation or communication devices, that gather, process, search, and/or provide information in a manner described herein. Campaign manager 222 may receive trick play notification messages from client device 270. Campaign manager 222 may select appropriate trick play advertisements in response to the trick play notification messages. In one implementation, campaign manager 222 may access a dynamic set of advertising campaign rules, user profile information, and/or content information (e.g., time of day, program being played, etc.) that may be used to select particular trick play advertising in response to the trick play notification messages.

Data logger 224 may include one or more memory devices that store behavior information of client device 270 or of user(s) of client device 270. In one implementation, data logger 224 may include one or more fields, such as a user-identification field for storing an identifier associated with a user or client device 270, a date field for storing a date on which the user played a particular content, a time field for storing a time period during which the user played the particular content, a program content identification field for storing an identifier associated with the content, a user information field for storing demographics information of the user, a user preferences field for storing information about what content the user prefers and/or information about what goods/services the user prefers, a type of trick play field for storing information about a trick play requested by the user during the playing of the content, a level of trick play field for storing a speed of the play requested by the user (the type of trick play field may include the level of trick play field information), a determined available time period field for storing information about an available time period determined in response to the trick play, an advertising field for storing information about what trick play advertising was selected for the determined available time period, and/or an actual end field for storing information about when, during the determined available time period, the selected trick play advertising was interrupted and/or the client device started playing the content again.

Data logger 224 may include multiple databases stored locally at data center 220 and/or stored at one or more different and possibly remote locations. Information from data logger 224 may be retrieved by a backend server (or another server device) within, for example, content delivery system 210 to monitor trick play advertising data. Monitoring trick play advertising data may include determining what available time periods are being determined for what users at what times. Service and/or content providers may use the trick play advertising data to sell time slots, to advertisers, of future available time periods.

Linear advertising content database 230 may include one or more memory devices that receive and store linear advertising content from advertising sources 240. Linear advertising content may include, for example, advertising content that may be inserted within a break in programming (e.g., a conventional commercial break in broadcast programming).

Trick play advertising content database 235 may include one or more memory devices that receive and store trick play advertising from advertising sources 240. Trick play advertising may include, for example, advertising that may be presented, for example, based directly or indirectly on a trick play requested by a user via client device 270. Trick play advertising may include, for example, video advertising, still-image advertising, adaptive advertising (e.g., advertising that transitions from a still-mage to a video after a particular amount of time), etc. The trick play advertising may include a condensed version of a commercial included in content during which the trick play advertising is shown or an advertisement for a same product or for a same type of product as advertised in the content.

Advertising sources 240 may include one or more server devices, or other types of computation or communication devices, that gather, process, search, and/or provide information in a manner described herein. Advertising sources 240 may provide linear and trick play advertising content to linear advertising content database 230 and trick play advertising content database 235, respectively. In one implementation, advertising sources 240 may be controlled by one or more different entities than the entity that controls linear advertising content database 230 and/or trick play advertising content database 235.

Program content database 250 may include one or more memory devices that receive and store program content from content sources 260. Program content may include, for example, video-on-demand programming, PPV content, conventional broadcast programming, etc.

Content sources 260 may include one or more server devices, or other types of computation or communication devices, that gather, process, search, and/or provide information in a manner described herein. Content sources 260 may provide program content to program content database 250. In one implementation, content sources 260 may be controlled by one or more different entities than the entity that controls program content database 250 (e.g., the multimedia service provider).

Client device 270 may include any device capable of receiving, transmitting, and/or processing information to and/or from access network 290. In one implementation, client device 270 may be a closed device (e.g., including a hardware/software configuration that is not accessible to the general public). Client device 270 may provide video signals to display device 275. Examples of client device 270 may include a set-top box, a computer, a cable card, and/or a portable electronic device. Client device 270 may receive a television signal from gateway 285, may convert the signal to a form usable by display device 275, and may transmit the signal to display device 275 for display.

Client device 270 may further allow a user to provide user input to request trick plays (e.g., fast forward through the content displayed on display 110), to navigate menu displays (e.g., to select content), etc. via remote control 280. In one implementation, client device 270 may support interfaces using Enhanced TV Binary Interchange Format (EBIF). Client device 270 may also be capable of sending data to a backend server (e.g., content server 205, campaign manager 222, and/or a device within content delivery system 210) via access network 290. In another implementation, client device 270 may also include an integrated digital video recorder (DVR) that may enable client device 270 to store program/advertising content for later retrieval/presentation to a user. In some implementations, client device 270 may be incorporated into display device 275.

Display device 275 may include a digital or analog display 110 via which a user may view multimedia content (including, for example, conventional programming, interactive displays, and/or advertising). Display device 275 may refer to any device that may receive and display multimedia content delivered over access network 290 and/or through client device 270 for perception by users. Display device 275 may include technologies, such as cathode ray tube (CRT) displays, liquid crystal displays (LCDs), light-emitting diode (LED) displays, plasma displays, etc.

Remote control 280 may include a range of devices including function specific keys, number keys, and/or a full-text key pad. Remote control 280 may take the form of, for example, a television remote control, a STB remote control, a game controller, a keyboard, a keypad, a mouse, a PDA, a mobile telephone, etc. A user may interact with client device 270 using a keypad that is part of remote control 280. Signals may represent key selections. Remote control 280 may transmit the signals to client device 270 via an infrared transmission or another type of transmission. Remote control 280 may allow a user to request trick plays, navigate a program guide, select channels or programs for viewing, adjust display characteristics, and/or perform other interactive functions related to viewing multimedia-type content. Remote control 280 may include keys corresponding to different trick plays. For example, remote control 280 may include a fast forward button, a rewind button, a pause button, etc. In some implementations, client device 270 or display device 275 may include the functionality of remote control 280. In other implementations, a user may provide audio commands via a microphone instead of pressing keys of remote control 280.

Local gateway 285 may include a network device that provides an interface from access network 290 to client device 270 and/or other network connectivity devices (not shown). For example, when telecommunication services are provided to a customer's premises via an optical fiber, gateway 285 may include an optical network terminal (ONT) that connects to the optical fiber. The ONT may convert between signals appropriate for display device 275 and signals appropriate for transmission over optical fiber. For example, the ONT may include a coaxial cable connection that leads to display device 275 or client device 270. The ONT may also include an Ethernet output port that connects to a personal computer or a voice over Internet protocol (VoIP) telephone and/or a standard telephone port for connecting to a standard telephone. Gateway 285 may include one of a number of possible gateway devices, including a satellite antenna and receiver, a coaxial cable connection, an ONT, or a broadband access for Internet Protocol TV (IPTV). The satellite antenna and receiver may provide an interface for television services broadcast from satellites. The coaxial cable connection may provide an interface for television services connected to a customer via coaxial cables. The ONT may provide an interface for an optical fiber connection. The broadband IPTV access may generally include any device that provides broadband access over which television service may be provided.

Access network 290 may include a video signaling and distribution network and system that permit transfer of data between content delivery system 210 and client devices 270. Additionally, access network 290 may include, among other things, a firewall, a filtering mechanism, a proxy, and/or a network address translation mechanism. Access network 290 may include, for example, a single network, such as a wide area network (WAN), a local area network (LAN), a metropolitan area network (MAN), a telephone network (e.g., a public switched telephone network (PSTN) or a wireless network), the Internet, a satellite network, etc., or a combination of networks. Access network 290 may provide customers with multimedia content provided, for example, by content server 205 and/or content delivery system 210.

In an implementation described herein, client device 270 may receive programming from content delivery system 210. During a playing of the content, a user may request, via remote control 280, trick plays. Client device 270 may provide information about a trick play (e.g., by generating and transmitting a trick play notification message based on the trick play) to campaign manager 222 via access network 290. Campaign manager 222 may provide an appropriate response based on, for example, the trick play, user profile data, and/or content information (e.g., time of day, program being played, etc.). The appropriate response may include, for example, one or more trick play advertisements to display during an available time period created by the trick play. Client device 270 may receive the trick play advertisement from campaign manager 222 and/or from content delivery system 210 (after campaign manager transmits one or more request for the advertisements to content server 205). In another embodiment, client device 270 may retrieve the trick play advertisements from an internal memory.

Figure 3:
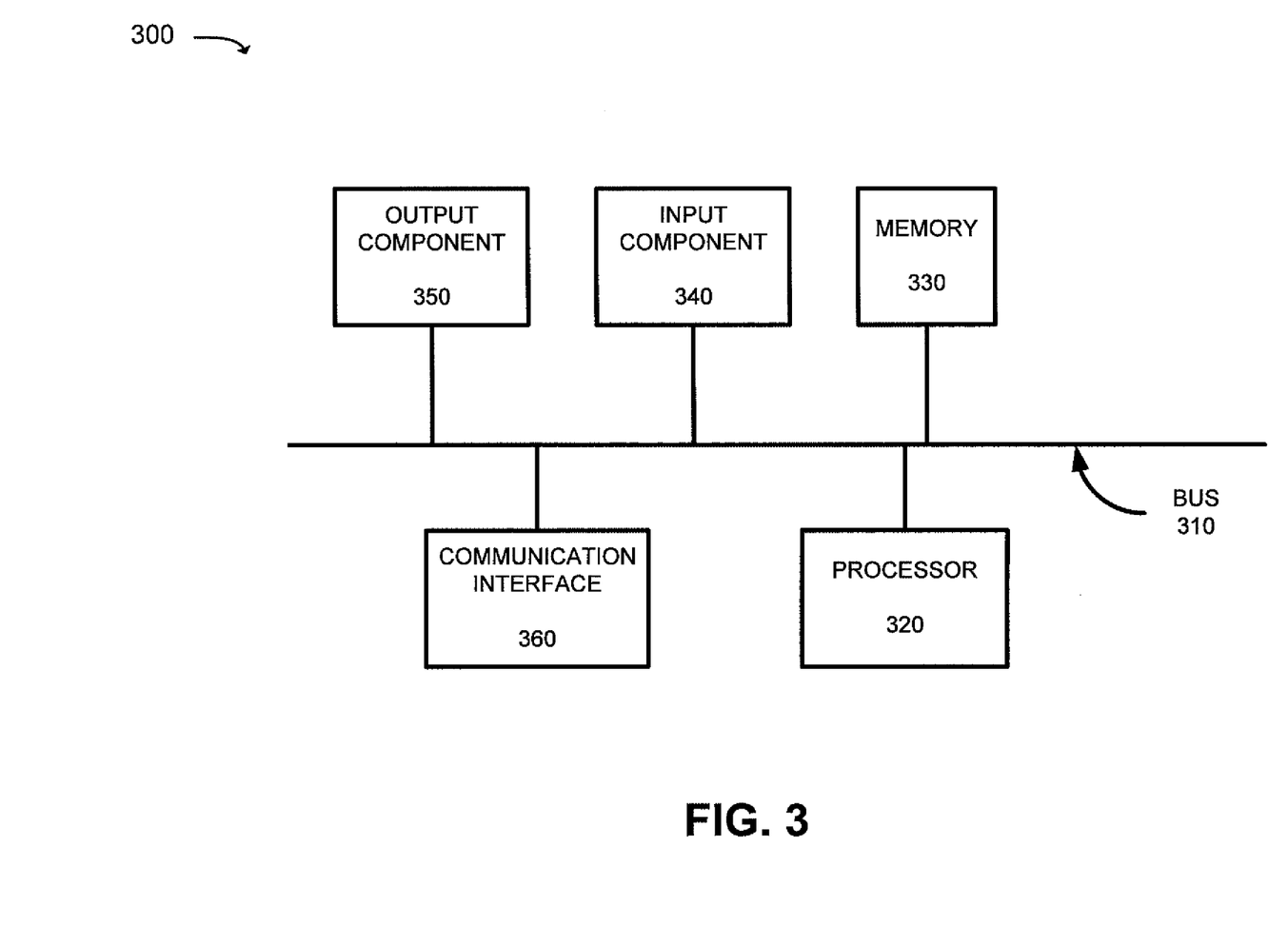
FIG. 3 is a diagram of example components of one or more of the devices of FIG. 2.

FIG. 3 is a diagram of example components of a device 300 that may be associated with content server 205, content delivery system 210, user profile database 215, campaign manager 222, data logger 224, linear advertising content database 230, trick play advertising content database 235, advertising sources 240, program content database 250, content sources 260, client device 270, and/or display device 275. Each of content server 205, content delivery system 210, user profile database 215, campaign manager 222, data logger 224, linear advertising content database 230, trick play advertising content database 235, advertising sources 240, program content database 250, content sources 260, client device 270, and display device 275 may include one or more devices 300.

As shown in FIG. 3, device 300 may include a bus 310, a processor 320, a memory 330, an input component 340, an output component 350, and a communication interface 360. In another implementation, device 300 may include additional components, fewer components, different components, or differently arranged components than are shown in FIG. 3.

Bus 310 may include a path that permits communication among the components of device 300. Processor 320 may include a processor, microprocessor, or processing logic that may interpret and execute instructions. Memory 330 may include any type of dynamic storage device that may store information and instructions for execution by processor 320, and/or any type of non-volatile storage device that may store information for use by processor 320.

Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc. Communication interface 360 may include any transceiver-like mechanism that enables device 300 to communicate with other devices and/or systems. For example, communication interface 360 may include an Ethernet interface, an optical interface, a coaxial interface, a wireless interface, or the like.

As will be described in detail below, device 300 may perform certain operations. Device 300 may perform these operations in response to processor 320 executing software instructions (e.g., computer program(s)) contained in a computer-readable medium, such as memory 330, a secondary storage device (e.g., hard disk, CD-ROM, etc.) or other forms of RAM or ROM. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
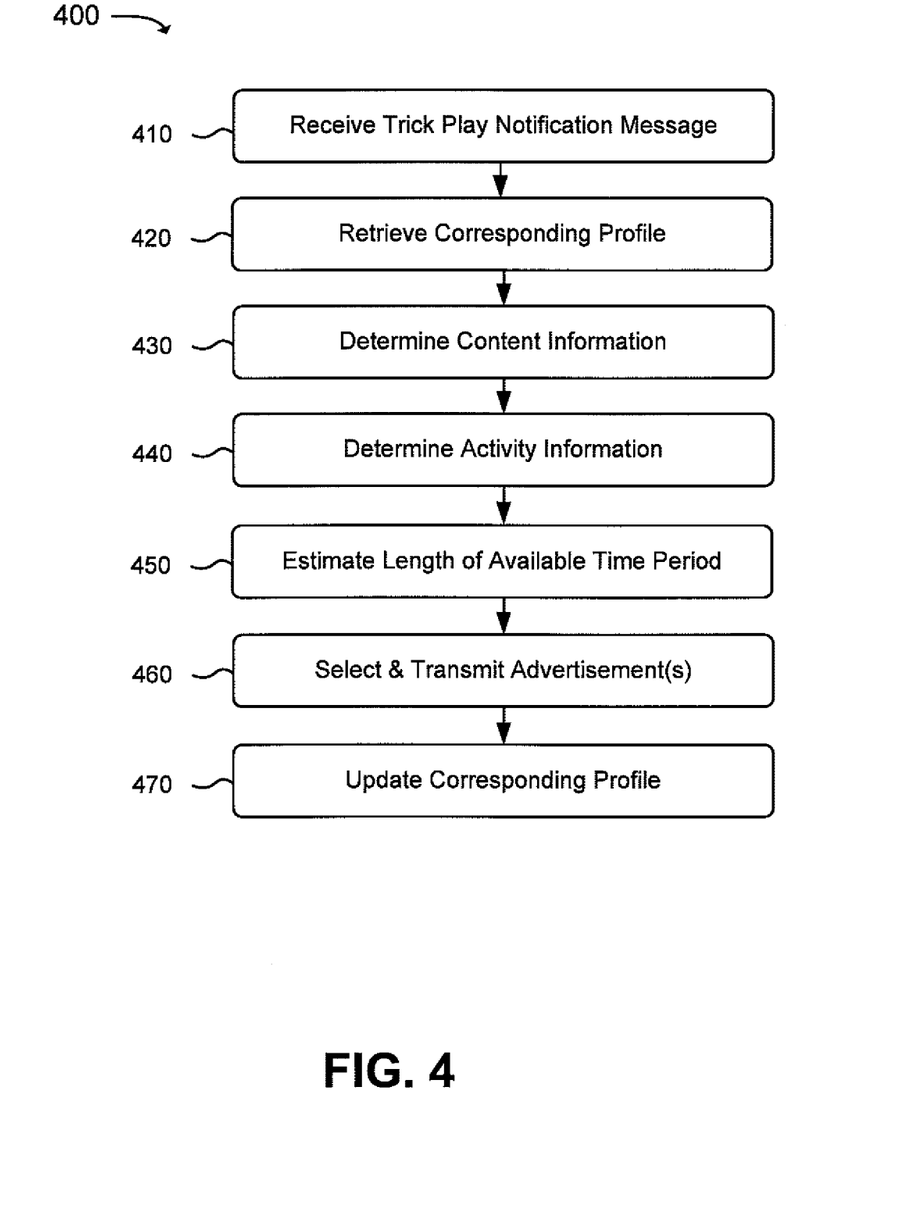
FIG. 4 is a flowchart of an example process for providing trick play advertising.

FIG. 4 is a flowchart of an example process 400 for providing trick play advertising. In one implementation, process 400 may be performed by campaign manager 222. In another implementation, some or all of process 400 may be performed by a device or collection of devices separate from, or in combination with, campaign manager 222. For example, process 400 may be performed by campaign manager 222, content server 205, and/or content delivery system 210. Herein, a "remote server" may refer to a device or collection of devices separate from, or in combination with, campaign manager 222.

Process 400 of FIG. 4 may include receiving a trick play notification message (block 410). A user may use client device 270 to obtain content 120, via a network. The user may obtain the content from a service provider (e.g., by using a VOD service, a PPV service, a website service, etc.). Client device 270 may receive the content, via the network, and play the content by displaying the content on display device 275. During the playing of the content, the user may request a trick play by prompting remote control 280 to transmit trick play signals to client device 270. For example, the user may press a fast forward button, of remote control 280, four times to fast forward through the content at level 4. Remote control 280 may transmit trick play signals, corresponding to the user pressing the fast forward button four times, to client device 270. Client device 270 may determine, based on the trick play signals, that the user requested a trick play of fast forwarding through the content at level 4. In response, client device 270 may perform actions necessary to fast forward through the content at the requisite speed.

Display device 275 may display the fast forwarding of the content. Simultaneously, or substantially simultaneously, client device 270 may generate a trick play notification message. The trick play notification message may include, for example, an identifier of the user and/or an identifier of client device 270, information about the trick play requested by the user (e.g., a type of the trick play (e.g., fast forward, fast forward at level 4) and/or a level of the trick play (e.g., level 4)), information about the content, and/or information about a point in/a portion of the content at/before which the user requested the trick play. Client device 270 may transmit the trick play notification message to a remote server. The remote server may receive the trick play notification message.

A corresponding profile may be retrieved (block 420). In one implementation, the remote server may determine an identifier included within the trick play notification message. Thereafter, the remote server may retrieve a profile corresponding to the identifier from, for example, user profile database 215. The profile may include information for the user, for one or more users of client device 270, and/or for client device 270. For explanatory purposes only, assume here that the corresponding profile is for the user. The corresponding profile may include behavior information, demographic information, preferences, etc.

The behavior information may include, for example, data about previous trick plays requested by the user. The remote server and/or client device may add an entry to behavior information and/or update behavior information after every trick play requested by the user. An entry of the behavior information may include, for example, a type of a trick play requested by the user during a playing of content (e.g., fast forwarded at level 4), a period of time that elapsed before the user requested to return to playing of content (after requesting the trick play) (e.g., 15 seconds), an identifier associated with the content (e.g., Sopranos), information associated with the content (e.g., a type of the content (e.g., HBO series, Drama, etc.), a length of the content, etc.), portion information associated with a portion of the content before which the user requested the trick play (e.g., 3 minutes of commercials), a time of day (e.g., 8:17 P.M.) and/or day of week (e.g., Monday) of the playing of the content and/or the request of the trick play, and/or any other information that allows the remoter server to predict/determine a length of an available time period for presenting future trick play advertisements. Overall, the entries of the behavior information may indicate, for example, that the user typically fast forwards through commercials for 15 seconds while watching Sopranos.

The demographic information may include, for example, a gender of the user, an age of the user, an income of the user, an education level of the user, an occupation of the user, a race/ethnicity of the user, geographic locations associated with the user, family information associated with the user, type of service(s) providing television content to the user, (e.g., premium channels, free-content provider, on demand, Internet-based service provider, etc), etc. In one implementation, the demographic information may be collected from the user when the user signs-up for the services(s) or at later points in time (e.g., when a user pays a bill online for the service by using a web portal provided by the service provider). In another implementation, the service provider may collect demographic information about the user from one or more third parties.

The preferences of the user may include information about genre/types of television content that the user plays and/or records (e.g., animated cartoons, financial news shows, etc.), channels that the user selects and/or records (e.g., Cartoon Network, CNN, etc.), types of channels that the viewer selects (e.g., channels for children, news channels, music channels, etc.), advertisements that the user allows to play (e.g., without fast forwarding) during various time periods using various client devices (including client device 270). The information about the advertisements that the user allows to play may include category of advertisements (e.g., car commercials), length of advertisements (e.g., less than 15 seconds), a time of day that the advertisements are shown (e.g., before 10:00 p.m.), etc. The remote server and/or client device may collection information associated with the preferences of the user while the user uses one or more service(s) to play different content.

Additionally, or alternatively, the preferences may include information provided by the user about personal preferences. For example, the user may use a computer terminal to provide information about (types of) goods, services, and/or ideas that the user finds interesting. Additionally, or alternatively, the preferences may include information collected about the user by third parties (e.g., marketing firms) and/or in different environments (e.g., what type of websites that the user visits while browsing the Internet, what type of goods and/or services the user purchases, etc.). Information may be collected and/or used regarding a user's behavior, demographics, and/or preferences only with that user's express permission.

Content information may be determined (block 430). For example, the remote server may determine content information associated with the content the user is playing. The content information may include general information associated with the content the user selected and portion information associated with a portion of the content during/at start of which the user requested the trick play. For example, assume that the user selected and is playing an episode of Sopranos, and that the user requested the fast forward trick play at the 17:00 minute mark of the episode right after a second set of commercials (embedded in the downloaded content) began. The remote server may determine, for example, the following general information, in this instance: Sopranos, Italian, Mature Audience, drama, HBO series, syndicated, 7 years old, etc. The remote server may determine, for example, the following portion information, in this instance: a 3:00 minute advertisement slot, an identifier of a particular detergent commercial, an identifier of a particular bank commercial, etc. In one implementation, the remote server may determine the content information based on the trick play notification message. In another implementation, the remote server may determine the content information on its own because the remote server is providing the content and/or by retrieving the content information from other server(s) associated with providing the content.

Activity information may be determined (block 440). For example, the remote server may determine activity information based on the trick play notification message and based on other previously received trick play notification messages. The other previously received trick play notification messages may include messages that are received after a last time that the user interrupts the playing of the content. For example, assume that while the content is playing the user fast forwards the content at level 2, then fast forwards the content at level 4, then rewinds the content at level 1, and then pauses the content (without pressing play (or allowing the content to play) at any time in between). The remote server may receive the last trick play notification message after the user pauses the content. Prior to receiving the last trick play notification message, the remote server may have received three other different trick play notification messages associated with the trick plays requested by the user prior to the pause trick play request.

A length of an available time period may be estimated (block 450). For example, the remote server may estimate a length of an available time period, during which advertisements may be shown to the user, based on a type of the trick play requested, a level of the trick play requested, the behavior information, the content information, and/or the activity information by applying one or more rules. The remote server may perform a statistical analysis to estimate the length of an available time period based on statistics collected for the user (e.g., behavior information), statistics collected for multiple users who watch same content or type of content being played, and/or statistics collected for multiple users who watch different content.

The statistical analysis may utilize the best (most specific) statistics that are available for a particular user watching a particular content. For example, if no behavior information is available for the user and no statistics are available for any other users who watched the particular content/type of content, the remote server may only be able to utilize general statistic that were collected for multiple users who watch different content. Assume that the trick play requested by the particular user is fast forwarding at level 4. The general statics may indicate that whenever users fast forward at level 4, the users usually allow the fast forwarding trick play to continue for at least 15 seconds. The remote server may perform the statistical analysis by applying the general statistics to estimate a 15 seconds length of the available time period for the trick play requested by the particular user.

In another example, assume that extensive behavioral information is available for the user and the remote server may match the portion information and/or the activity information to entries, of the behavior information, that include similar information. In this example, the remote server may select entries, from the behavior information, with the same trick play (including, type and/or level of the trick play), the same content or type of content being played, the same type of portion (e.g., 3 minutes of embedded advertisement), and/or same activity information (e.g., fast forwarding at level 2 after fast forwarding at level 4) as specified in the content information and the activity information. The remote server may use information from the selected entries to estimate a length of the available time period. For example, the remote server may determine an average length of time or a minimum length of time during which the trick plays were allowed to occur in the selected entries. The remote server may use the average length of time or the minimum length of time as the length of the available time period.

In another implementation, the remote server may specify predefined lengths of time (e.g., 15 seconds) to be used for an available time period when behavior information does not include any entries that match portion information and/or activity information associated with an occurrence. In yet another implementation, the remote server may adjust a length of a determined available time period based on the activity information and applicable rules. For example, a rule may specify to add 10 seconds to the length of the available time period when the activity information indicates that the user paused the content after fast forwarding the content at level 2.

For example, assume that the user is watching Sopranos. The portion information of the content information may indicate that the user prompted the trick play request at a beginning of a 3 minute advertisement break. The activity information may indicate that the content was playing before the user entered the trick play request to fast forward at level 4. Further assume that the remote server determines based on entries of the behavior information that when the user watches Sopranos and fast forwards at level 4 when a 3 minute advertisement break begins, the fast forwarding continues, on average/at least, for 15 seconds, before playing the Sopranos content again. In this example, based on the aforementioned behavior information, portion information, and/or activity information, the remote server may estimate, for example, a 15 second length for the available time period to be used for trick play advertising.

In another embodiment, the remote server 270 may determine that showing advertisements during the available time period may potentially interfere with the user's experience. Remote server 270 may make that determination, for example, when the estimate of a length of an available time period is less than a predefined minimum length of time (e.g., 2 seconds). In this instance, remote server 270 may not proceed with process 400 after block 450 until remote server 270 estimates a new length for a new available time period.

Advertisements may be selected and transmitted (block 460). For example, the remote server may select advertisements for the available time period. In one implementation, the remote server may preselect (e.g., when the user first requests the content) advertisements for different possible available time periods of different lengths. For example, the remote server may select ad 6 for any available time period that is less than 5 seconds in length, ad 1 and ad 17 for any available time period that is 15 seconds in length, ad 12 for an available time period that is 30 seconds in length, etc.

In another embodiment, the remote server may select advertisements for the available time period based on the length of the available time period, the corresponding profile (including, for example, the demographics information and the preferences of the user), and/or the content information (including, for example, information about the content and portion information about a portion of the content at which the user requested the trick play). To do so, for example, the remote server may determine different configurations of time slots that may fit in the available time period based on the length of the available time period. Advertisers may buy timeslots of different lengths and request to show trick play advertisements for their products and/or services, during the time slots, when certain criteria are met. For example, the criteria may specify that a particular trick play advertisement may only be shown to users with particular demographic information, who have certain preferences, and/or while the users are playing particular content.

In other embodiments, the criteria may further specify that the particular trick play advertisement may only be shown when the portion (as indicated the portion information) includes advertisements for the advertiser's products/services and/or for the same type of products/services. The trick play advertisement may be a condensed version of the advertisement included in the portion. The remote server may determine what available trick play advertisements may fill the different configurations of time slots of the available time period. The remote server may select the advertisements (and a corresponding configuration of time slots), for example, based on which most fill the available time period.

For example, assume that an available time period that is 15 seconds in length is determined. The remote server may determine the following different configurations of time slots for the available time period: a single 15 second time slot; a first 8 second time slot and a second 7 second time slot to be shown sequentially; a first 10 second time slot to be shown before a concurrent showing of a second 5 second time slot and a third 5 second time slot; etc. Further assume that the corresponding profile indicates that the user is a 35 year old woman who buys a lot of household products and that the content information indicates that the user is watching an episode of "Clean House." Also assume that the portion information indicates the user fast forwarded before a 3 minute advertisement break that includes a particular detergent commercial. The advertiser of the particular detergent commercial may have bought a 15 second time slot to show a condensed detergent commercial as trick play advertising, during "Clean House," to users who are women over 35 years old and/or buy a lot of household products. In this example, the remote server may select the 15 seconds condensed detergent commercial to show during the single 15 second time slot of the available time period. In another embodiment, as shown in FIG. 1, multiple trick play advertisements may be selected to be shown sequentially or at the same time to the user. The remote server may transmit the selected trick play advertisements to client device 270.

In yet another embodiment, a seller of time slots (e.g., a service provider) may categorize different time slots (of different length) during different types of future available time periods (e.g., during particular time periods) based on behavior information of multiple users. The seller may set different prices for different categories of time slots. For example, a service provider may price a 15 seconds time slot, to be shown during a particular type of content, at a premium when available time periods of 15 seconds or more in length are rarely estimated during the showing of the particular type of content. A service provider may further set prices for different time slots based on what users are selected to watch the advertisement during a timeslot. For example, the service provider may charge progressively more based on income levels of users (e.g., the advertiser may have to pay more to show an advertisement during a timeslot to a user who has a higher income). Additionally, or alternatively, may set values of different timeslots for an individual users based on demographic information of the user, preferences of the user, behavior information of the user, etc. As described above, the advertiser may buy timeslots to show advertisement(s) to particular users selected by the advertiser or to users who meet predefined criteria set by the advertiser. Accordingly, a price of time slots may be based on at least one or more of a length of the time slot, preferences of the user, demographic information associated with the user, or content information associated with the content.

The corresponding profile may be updated (block 470). Client device 270 may receive the selected trick play advertisements. Thereafter, client device 270 may cause the selected trick play advertisements to be displayed in a portion of display 110 so as not to completely obscure the content. During the display of the selected trick play advertisements, the user may use remote control 280 to interrupt the selected trick play advertisements. For example, the user may enter a command to play the content. In response, client device 270 may transmit a message to the remote server. The message may notify the remote server that the selected trick play advertisements were interrupted at a particular point by the user to return to playing the content. The remote server may update the user's corresponding profile (e.g., the behavior information in the corresponding profile) based on the information in the message. In another example, the user may interrupt the selected trick play advertisements by entering a command for a new trick play. Process 400 may repeat for the new trick play. Before doing so, the remote server may also update the user's corresponding profile based on the receipt of the new trick play.

In another embodiment, the remote server may determine that the selected advertisements were shown in full and that the user did not return to playing the content (i.e., the trick play continued). The remote server may also update the user's corresponding profile based on the determination. Furthermore, blocks 450-470 may repeat to provide additional advertisements, to show to the user, to client device 270 when the trick play continues longer than the determined available time period. In other embodiments, client device 270 may cause the selected trick play advertisements to be displayed again in display 110 when the trick play continues longer than the determined available time period.

In yet another embodiment, the selected advertisements may include adaptive advertisements. For example, adaptive advertisements may include a still-image advertisement and a video advertisement for a particular product. Client device 270 may show the still-image advertisement for a predefined period of time (e.g., 3 seconds) and then show the video advertisement if the user does not return to playing the content before an end of the predefined period of time.

Figure 5:
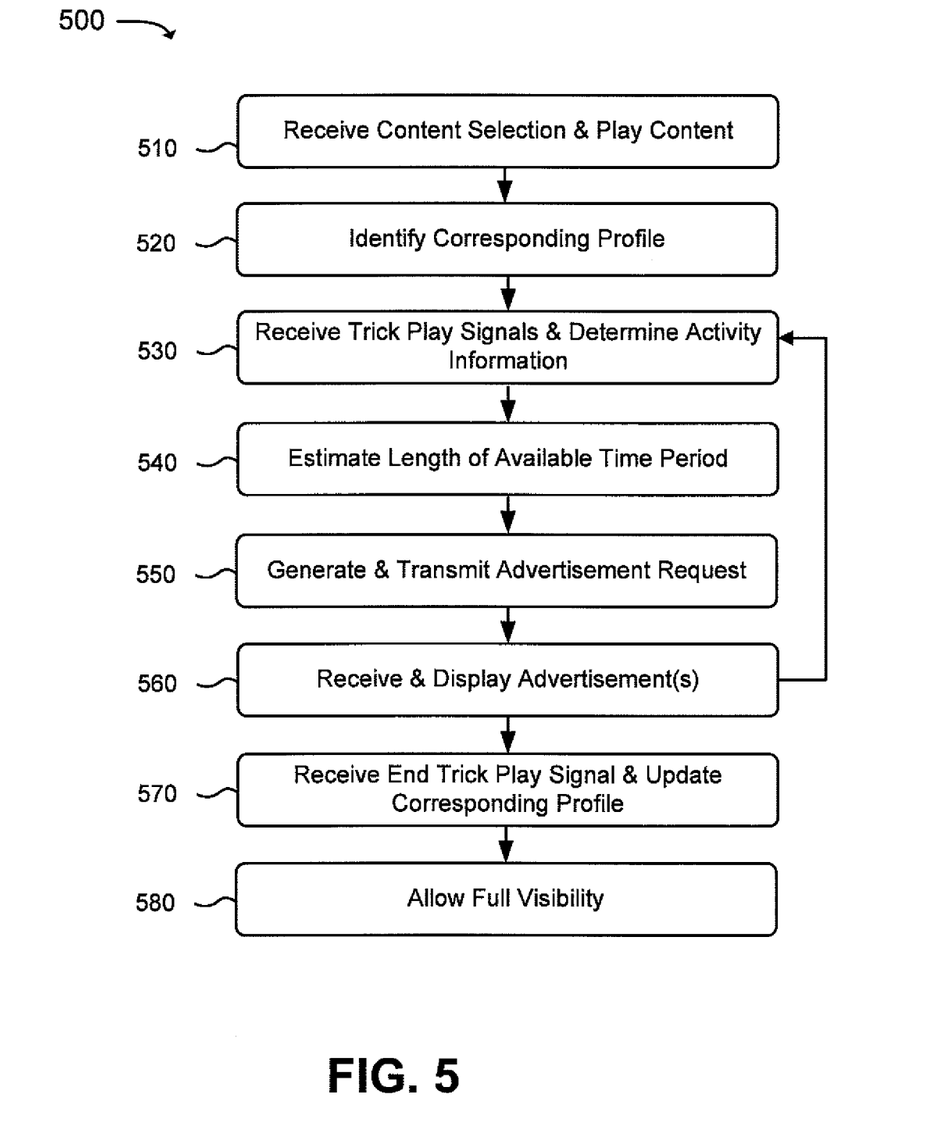
FIG. 5 is a flowchart of another example process for providing trick play advertising.

FIG. 5 is a flowchart of an example process 500 for providing trick play advertising. In one implementation, process 500 may be performed by client device 270. In another implementation, some or all of process 500 may be performed by a device or collection of devices separate from, or in combination with, client device 270.

Process 500 may include receiving content selection and displaying content (block 510). For example, a user may use client device 270 (e.g., by using a DVR service) to schedule recording of content provided by television content providers. Client device 270 may record the content at a time when the content is being provided. In another embodiment, client device 270 may automatically buffer the content without the user scheduling the recording of the content. The user may use, for example, remote control 280 to select to play the content. Client device 270 may receive the content selection. In response, client device 270 may retrieve the content based on the content selection. Client device 270 may play the content by displaying the content in display 110 of display device 275.

A corresponding profile may be identified (block 520). In one implementation, a corresponding profile may include behavior information, demographic information, preferences, etc. for the individual user and/or for multiple users of client device 270. In one embodiment, client device 270 may store the corresponding profile. In another embodiment, a remote device (e.g., user profile database 215) may store the corresponding profile. Client device 270 may retrieve the corresponding profile after the user requests to play recorded content.

Trick play signals may be received and activity may be determined (block 530). For example, during the playing of the content, the user may use remote control 280 to transmit trick play signals to client device 270. Client device 270 may receive the trick play signals. Client device 270 may determine a trick play (e.g., fast forward at level 2, rewind at level 3, pause, etc.) being requested by the user based on the trick play signals. Thereafter, client device 270 may determine the activity information based on the trick play and previously requested trick plays. The activity information may include information regarding the current trick play and what, if any, trick plays were requested between a previous interrupting of the playing of the content and the current trick play. For example, while the content is playing the user may fast forward the content at level 2, then fast forward the content at level 4, and then rewind the content at level 1. The current trick play may include rewinding the content at level 1. The activity information may specify the fast forwarding at level 2, followed by the fast forwarding at level 4, followed by the current rewinding at level 1.

A length of an available time period may be estimate (block 540). For example, client device 270 may estimate an available time period that is created for trick play advertising by the trick play request. To do so, client device 270 may first determine portion information regarding a portion of the content before which the user requested the trick play. Client device 270 may communicate with external devices to determine the portion information. For example, assume that a user requested the trick play at a 15:12 minute mark of a recorded 2011 NCAA wrestling championships program content. Client device 270 may transmit a request to an external device to determine what was playing at the portion of/after the 15:12 minute mark of the 2011 NCAA wrestling championships program content. Client device 270 may estimate a length of the available time period based on the portion information, the activity information (including, for example, a type and a level of trick play request), and the user's profile (e.g., the behavior information in the user profile). Client device 270 may use the same techniques that are described above being used by the remote server, in reference to block 450 of FIG. 4, to estimate the length of the available time period.

An advertisement request may be generated and transmitted (block 550). For example, client device 270 may generate an advertisement request to retrieve advertisements to fill the available time period. The advertisement request may include information about the available time period (e.g., the length of the available time period), an identifier and/or content information associated with the recorded content, the portion information, information from the user's profile, etc. In another embodiment, client device 270 may have access to a database that stores information about different advertisements (e.g., advertisements for available time periods of different lengths). Client device 270 may use the database to select advertisements for the available time period based on, at least, a length of the available time period. Client device 270 may generate an advertisement request that includes identifiers of the advertisements. Client device 270 may transmit the advertisement requests to a remote server (e.g., campaign manager 222) that provides advertisements.

In another embodiment, client device 270 may determine that showing advertisements during the available time period may potentially interfere with the user's experience. Client device 270 may make that determination, for example, when the estimate of a length of an available time period is less than a predefined minimum length of time (e.g., 2 seconds) and/or when a type and a level of a trick play requested by the user suggest that a user wants to view only the content (and not advertisements) during the trick play (e.g., when the user rewinds at level 1). In this instance, client device 550 may not proceed with process 500 after block 540 until client device 270 estimates a new length for a new available time period.

Advertisements may be received and displayed (block 560). In one implementation, the remote server may receive the advertisement request from client device 270. The remote server may retrieve advertisements based on the advertisement request (i.e., to fulfill the advertisement request). The remote server may transmit the advertisements to client device 270. In another embodiment, the remote server may transmit instructions to other devices and/or servers to transmit the advertisements to client device 270. Client device 270 may receive the advertisements. Client device 270 may display the advertisements in one or more portions of display 110 so as not to completely obscure the content.

In yet another embodiment, client device 270 may store advertisements for one or more possible available time periods of different lengths. Client device 270 may (request and) receive the advertisements after identifying the corresponding profile (block 520) and before receiving the trick play signals. After determining an available time period (block 540), client device 270 may retrieve one or more of the received advertisements, for the available time period, from its own storage based on a length of the available time period, the activity information, and/or the portion information. Client device 270 may receive new advertisements for future available time periods after displaying some of the previously received advertisements and/or on a periodic basis.

An end trick play signal may be received and the corresponding profile may be updated (block 570). For example, while displaying the advertisements, client device 270 may receive new trick play signals or receive an end trick play signal. If client device 270 receives new trick play signals for a new trick play request, client device 270 may repeat a part of process 500, which is described above in reference to blocks 530-560. Client device 270 may receive the end trick play signal when the user presses a play button on remote control 280. Client device 270 may update the corresponding profile based on when, during the available time period, the new trick play signals or the end trick play signal is received. Pricing of timeslots, which are sold to advertisers, during different available time periods may be modified based on the updates of the corresponding profile and updates of other profiles.

Full visibility may be allowed (block 580). For example, when client device 270 receives the end trick play signal, client device 270 may determine that the user is requesting to return to playing the content. In response, client device may morph display 110 to (gradually or immediately) remove the advertisements from display 110 and to allow full visibility of the content on display 110.

Figure 6A:
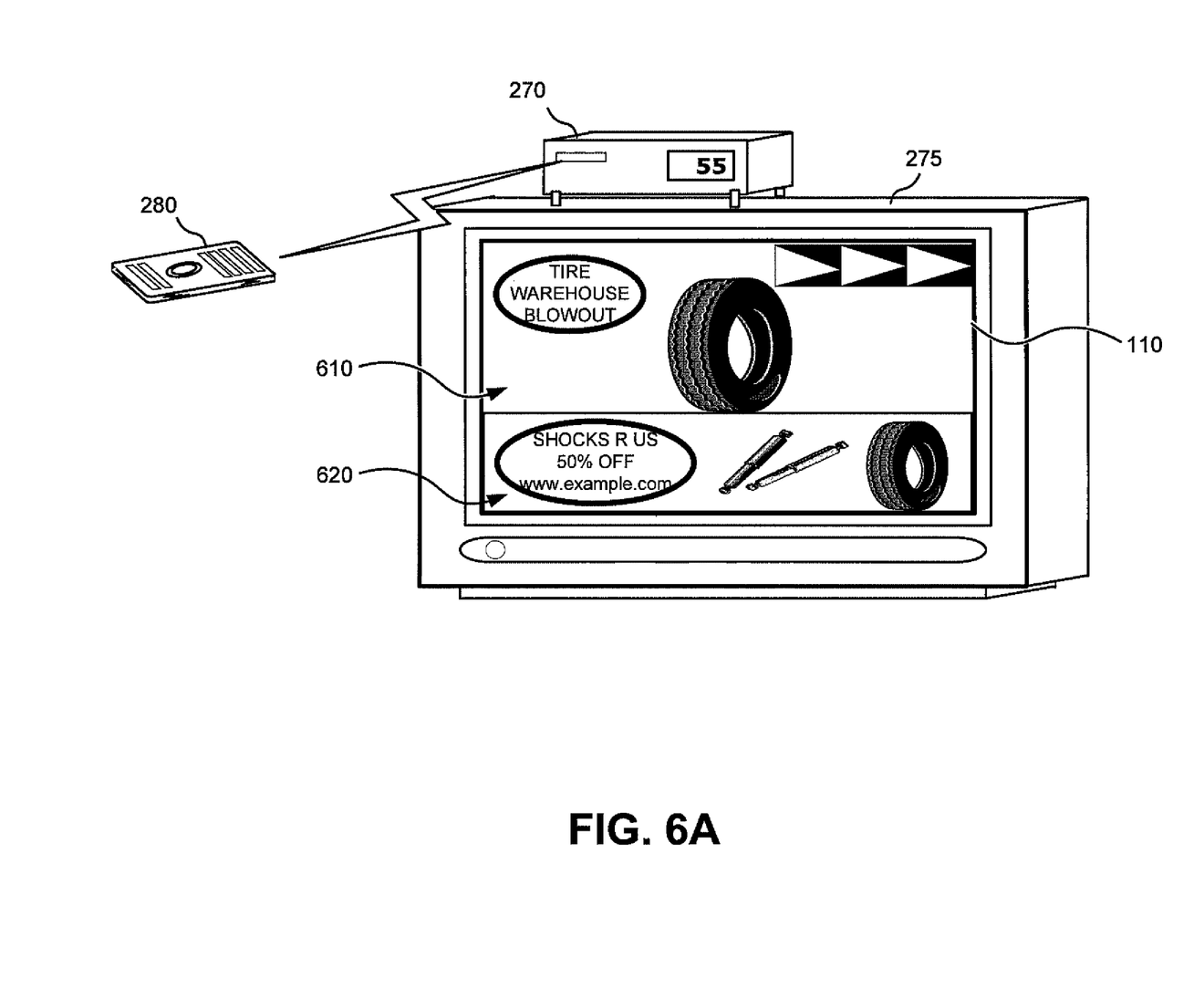
FIGS. 6A and 6B are diagrams of an example in which trick play advertising is provided.
Figure 6B:
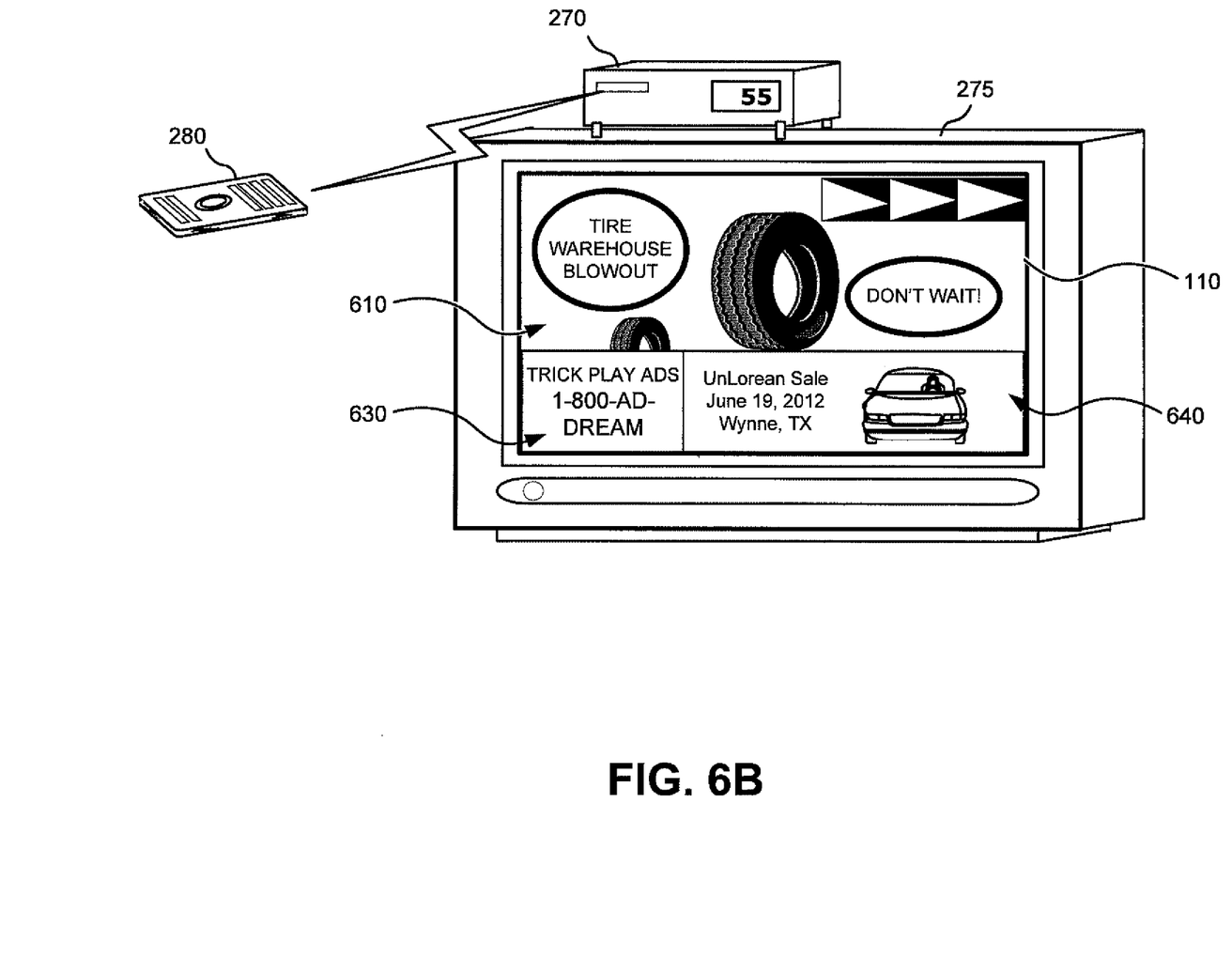

FIGS. 6A and 6B are diagrams of an example in which trick play advertising is provided. Assume that a user is watching content 610 (e.g., an episode of a reality series called "American Fighters" about mixed martial arts) on display 110 of display device 275, and a 2 minute advertisement break of content 610 begins. The user wants to bypass the advertisement break as quickly as possible, so the user may press the fast forward button, on remote control 275, three times. In response, remote control 275 may send trick play signal(s), associated with the pressing of the fast forward button, to client device 270. Client device 270 may determine that a user requested a trick play based on the trick play signal(s). Client device 270 may further determine that the user requested the trick play while watching an episode of "American Fighters" and at the beginning (e.g., during the first 5 seconds) of the 2 minute advertisement break. Client device 270 may also determine that the 2 minute advertisement break, of content 610, includes an advertisement for automobile parts sold by the Tire Warehouse.

Further assume that client device 270 has access to a profile of the user that is stored by a remote device (e.g., user profile database 215) and/or client device 270. The profile may include demographic information of the user, preferences information of the user, and behavior information of the user. Assume that the demographics information indicates that the user is a 35 year old man. Assume that the preferences information indicates that the user prefers to watch advertisements related to sports and automobiles. Assume that the behavior information indicates that whenever the user requests, during the first 5 seconds of an advertisement break, a trick play by pressing the fast forwards button three times during an episode of "American Fighters," the user allows the trick play to continue for/at least 30 seconds. Based on the behavior information, client device 270 may determine an available time period, for trick play advertisements, that is 30 seconds in length. In another implementation, client device 270 may also have statistics available about behavior of other users who requested trick plays of fast forwarding at level 3 during episodes of "American Fighters" and/or other content. Client device 270 may use perform a statistical analysis, based on the available statistics and/or the user's profile to estimate a 30 second length of the available time period.

In one embodiment, client device 270 may generate an advertisement request for trick play advertisements, for display during the available time period, on display 110 of display device 275. The advertisement request may include a length of the available time period, content information about content 610, portion information about the 2 minute advertisement break, demographic information of the user, and/or preferences information of the user. Client device 270 may transmit the advertisement request to a remote server.

Assume that Shocks R Us bought a 15 second time slot to play a trick play video advertisement 620 when content information indicates sports-related content, when portion information indicates that automotive commercials are included in a portion of the content at which the user requested the trick play, and when the demographic information indicates that the user is a male who is over 25 years old. Assume that a service that sells timeslots for the trick play advertisements reserved a 15 second time slot to play a still-image advertisement 630 (FIG. 6B) whenever the length of the available time period is greater than 15 seconds and other trick play advertisements are unavailable to fill a 15 second time slot. Assume that UnLorean bought a 15 second time slot to play a trick play video advertisement 640 (FIG. 6B) when the user prefers to watch advertisements related to automobiles. The remote server may select trick play advertisement 620, trick play advertisement 630, and trick play advertisement 640 for the available time period based on the 30 seconds length of the available time period, the information provided in the advertisement request, and the criteria specified by the advertisers.

Client device 270 may receive trick play advertisement 620, trick play advertisement 630, and trick play advertisement 640 from the remote server. As shown in FIG. 6A, client device 270 may display advertisement 620, on display 110 of display device 275, over a portion of content 610, which is being fast forwarded, for the first 15 seconds of the available time period. For the last 15 seconds of the available time period, as shown in FIG. 6B, client device 270 may simultaneously display trick play advertisement 630 and trick play advertisement 640.

The user wants to end the trick play, so the user may press the play button, on remote control 275, 10 seconds before an end of the available time period. Client device 270 may receive a corresponding play signal from remote control 275. In response, client device 270 may immediately end showing trick play advertisement 630 and trick play advertisement 640 and continue playing content 610 on display 110 of display device 275. Alternatively, if the user does not end the trick play (e.g., by pressing the play button of remote control 275) before the end of the available time period, client device 270 may, again, display trick play advertisement 630, and/or trick play advertisement 640 and/or display other trick play advertisements.

The foregoing description provides illustration and description, but is not intended to be exhaustive or to limit the invention to the precise form disclosed. Modifications and variations are possible in light of the above teachings or may be acquired from practice of the invention.

While series of blocks have been described with regard to FIGS. 4 and 5, the order of the blocks may be modified in other implementations. Further, non-dependent blocks may be performed in parallel. Also, in some embodiments, a process may include one or more blocks of FIG. 4 and one or more blocks of FIG. 5.

It will be apparent that systems and methods, as described above, may be implemented in many different forms of software, firmware, and hardware in the implementations illustrated in the figures. The actual software code or specialized control hardware used to implement these systems and methods is not limiting of the invention. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a server, a trick play notification message from a client device, where the trick play notification message comprises information about a trick play requested by a user during a playing of content;
   determining a length of an available time period, by the server in response to receiving the trick play notification message and prior to an occurrence of the requested trick play, by estimating a duration of the requested trick play based on information in the trick play notification message and information regarding at least one other trick play, wherein the at least one other trick play occurred prior to the trick play requested by the user, and wherein the available time period includes the estimated duration of the requested trick play;
   selecting, by the server, an advertisement for the available time period based on the length of the available time period; and
   transmitting, by the server, the advertisement for display during the available time period.

2. The method of claim 1, where estimating the length of the available time period comprises:
   determining an identifier based on the trick play notification message, where the identifier corresponds to the user or to the client device,
   retrieving a profile corresponding to the identifier, where the profile comprises behavior information about trick plays requested by the user, and
   estimating the length of the available time period based on the trick play requested by the user and the behavior information.

3. The method of claim 2, further comprising:
   receiving, before an end of the available time period, a new message, where the new message comprises information about a new trick play requested by the user or about a request to return to playing the content by the user;
   estimating a new length for a new available time period based on the new message when the new message comprises information about the new trick play requested by the user;
   determining whether the new length is greater than a minimum length of time;

selecting a portion of the advertisement, the advertisement, or a new advertisement for the new available time period only when the new length is greater than the minimum length of time, and updating the behavior information of the profile based on the new message.

4. The method of claim 1, where selecting the advertisement comprises:

retrieving a profile associated with the user or the client device based on an identifier in the trick play notification message, where the profile comprises at least one of preferences of the user or demographic information associated with the user, determining content information associated with the content, and selecting the advertisement based on the length of the available time period, the profile, and the content information.

5. The method of claim 4, where the content information comprises a title of the content, a type of the content, and portion information, where the portion information comprises information about a portion of the content at which the user requested the trick play, and where the portion information comprises at least one of a location within the content or one or more identifiers associated with particular commercials associated with the portion.

6. The method of claim 1, where the advertisement comprises a still-image advertisement, a condensed version of a commercial included in the content, or an advertisement for a same product or for a same type of product as advertised in the content, where the advertisement fits a time slot of the available time period, and where a price of the time slot is based on at least one or more of a length of the time slot, preferences of the user, demographic information associated with the user, or content information associated with the content.

7. The method of claim 1, further comprising:

receiving, before an end of the available time period, a new trick play notification message from the client device, where the new trick play notification message comprises information about a new trick play requested by the user;

determining activity information based on the trick play and the new trick play;

estimating a new length of a new available time period based on the activity information and a type of the new trick play, selecting a new advertisement for the new available time period; and transmitting the new advertisement, for display during the new available time period, to the client device.

8. The method of claim 1, where the trick play notification message further comprises one or more of:

a user identifier that uniquely identifies the user, a device identifier that uniquely identifies the client device, information about the content, or a point in the content at which the user requested the trick play.

9. A device comprising:

a memory to store content; and a processor to execute instructions in the memory to:

receive trick play signals during a playing of the content, determine a trick play being requested based on the trick play signals, determine, in response to receiving the trick play signals and before an occurrence of the requested trick play, a length of an available time period by estimating a duration of the requested trick play based on the trick play and information regarding at least one other trick play, wherein the at least one other trick play occurred prior to the trick play, and wherein the available time period includes the estimated duration of the requested trick play, retrieve an advertisement, of a plurality of advertisements of different lengths, for the available time period based on the length of the available time period, and display the advertisement, on a display, during the available time period.

10. The device of claim 9, where estimating the length of the available time period based on the trick play comprises:

estimating the length of the available time period based on at least one of a type of the trick play and a level of the trick play, and where the type of the trick play is one of pausing, fast forwarding, rewinding, slow-motion fast forwarding, or slow-motion rewinding.

11. The device of claim 9, where, when estimating the length of the available time period based on the trick play, the processor is further to:

determine behavior information associated with a user who prompted a transmission of the trick play signals to the device, where the behavior information comprises information about prior available time periods determined in response to prior trick play requests, determine portion information about a portion of the content at which the user prompted the transmission of the trick play signals, and estimate the available time period based on a type of the trick play, a level of the trick play, the behavior information, and the portion information.

12. The device of claim 9, where, when retrieving the advertisement for the available time period, the processor is further to:

generate an advertisement request, where the advertisement request comprises the length of the available time period and one or more of content information about the content or portion information about a portion of the content at which the user prompted the transmission of the trick play signals, transmit the advertisement request to a server, and receive the advertisement in response to the advertisement request.

13. The device of claim 12, where, when generating the advertisement request, the processor is further to:

retrieve profile information associated with a user who prompts a transmission of the trick play signals to the device, where the profile information comprises one or more of demographics information about the user or preferences of the user, and generate the advertisement request based on the profile information, where the advertisement request further comprises one or more elements of the demographics information or of the preferences.

14. The device of claim 9, where, when retrieving the advertisement for the available time period, the processor is further to:

generate an advertisement request, where the advertisement request comprises identifiers associated with the advertisements, transmit the advertisement request to a server, and receive the advertisements in response to the advertisement request.

15. The device of claim 9, where the processor is further to:

determine content information associated with the content, and select the advertisement based on the length of the available time period and the content information.

16. The device of claim 9, where the processor is further to:

receive an end trick play signal, where a user prompts a transmission of the end trick play signal, to the device, during the trick play and before an end of the available time period, and allow full visibility of the content, by ending the displaying of the advertisements, in response to the end trick play signal.

17. One or more non-transitory computer-readable media storing instructions executable by one or more processors of a computing device, the media storing one or more instructions for:

determining a trick play requested by a user during a playing of content;

retrieving a profile corresponding to the user;

determining, in response to determining the trick play and prior to an occurrence of the requested trick play, a length of an available time period by estimating a duration of the requested trick play based on the trick play and behavior information of the profile, wherein the available time period includes the estimated duration of the requested trick play; and providing the advertisement based on the length of the available time period.

18. The media of claim 17, where providing the advertisement comprises:

selecting the advertisement for the available time period based on the length of the available time period and on one or more of content information associated with the content, demographics information specified in the profile, or preferences specified in the profile, and transmitting the advertisement to a device that displays the content, where the demographics information comprises one or more of a gender of the user, an age of the user, an income of the user, an education level of the user, an occupation of the user, one or more geographic locations associated with the user, family information associated with the user, or one or more types of television service utilized by the user, and where the preferences comprise information about types of goods or services of interest to the user.

19. The media of claim 18, where estimating the length of the available time period based on the trick play comprises:

estimating the length of the available time period based on a type of the trick play and a level of the trick play, and determining a category of the available time period based on the length, where the available time period comprises a time slot for the advertisement, and where a price of the time slot is based on the category of the available time period.

20. The media of claim 17, further storing instructions for:

determining a new request, where the new request is a request to end the trick play and to return to the playing of the content or to switch to a new trick play; and updating the behavior information based on the new request.

* * * * *